July 6, 1943.  R. E. MARBURY ET AL  2,323,720

PROTECTIVE DEVICE FOR SERIES CAPACITORS

Filed Sept. 27, 1940

WITNESSES:
James F. Young
F. P. Lyle

INVENTORS
Ralph E. Marbury and
William E. Berkey.
BY
O. S. Buchanan
ATTORNEY

Patented July 6, 1943

2,323,720

UNITED STATES PATENT OFFICE 2,323,720

PROTECTIVE DEVICE FOR SERIES CAPACITORS

Ralph E. Marbury, Wilkinsburg, and William E. Berkey, Forest Hills, Pa., assignors to Westinghouse Electric & Manufacturing Company, East Pittsburgh, Pa., a corporation of Pennsylvania Application September 27, 1940, Serial No. 358,635

2 Claims. (Cl. 200—118)

The present invention relates to protective devices for series capacitors or similar circuit elements, and, more particularly, to a simple and inexpensive device for protecting them against overvoltages caused by abnormal line currents.

Series capacitors are connected in series with alternating current transmission or distribution lines in order to neutralize part or all of the inductive reactance of the line, and thus to improve the voltage regulation and increase the stability limits. Capacitors are also sometimes connected in series with certain types of industrial apparatus which have a fluctuating power demand, such as welders and electric furnaces, in order to neutralize the inductive reactance of the apparatus, and thus decrease the severity of the voltage changes on the system to which it is connected. Since such capacitors are connected in series with the line, they carry the line current, and the voltage across the capacitor is proportional to the current. For this reason, the capacitor may be subjected to very high voltages in case of a short-circuit on the line or a heavy overload. Capacitors cannot be economically used in this way if their voltage rating is selected on the basis of the maximum voltage to which they may be subjected, and it is customary therefore to use capacitors having a voltage rating corresponding to the voltage across the capacitor under normal conditions together with some type of protective equipment to protect the capacitor against the high voltages that may appear across it under abnormal conditions.

Capacitors of the type used for series capacitor installations are designed to withstand an overvoltage of 150% of the rated voltage for very short periods and 200% of the rated voltage momentarily, and it is necessary to by-pass the capacitor if the voltage across it exceeds this value even for an instant. No mechanically operating switch can operate fast enough to give the necessary protection, and for this reason, it is customary to use a spark gap in parallel with the capacitor which breaks down substantially simultaneously with the occurrence of the overvoltage. The normal voltage across a series capacitor is usually of the order of a few hundred volts, and it is extremely difficult to calibrate spark gaps of the usual type for such a low voltage and to maintain their calibration unchanged after repeated operations because of the burning of the electrodes by the arc between them. For this reason, it has not been satisfactory to connect the spark gap directly across the terminals of the capacitor, and auxiliary gaps and transformers have been used to initiate breakdown of a main gap which is set for a considerably higher voltage than can be permitted to appear across the capacitor. With this type of protective equipment, it is necessary to by-pass the gap immediately after it has broken down in order to prevent damage to the gap and to surrounding structures by the arc, since the current traversing the gap may be very heavy, and for this purpose a contactor is usually provided to complete a shunt circuit around both the gap and the capacitor immediately after the gap has broken down.

Thus, the protective equipment which has been used with series capacitors has involved the use of transformers, auxiliary gaps, and contactors, and has been relatively complicated and expensive. The cost of the protective equipment has seriously restricted the use of series capacitors, since in many cases in which a relatively small capacitor would be desirable, the cost of the necessary protective equipment has made it economically unjustifiable, and in small installations, the cost of the protective equipment may even be greater than that of the capacitor units themselves.

The principal object of the present invention is to provide a protective device for series capacitors which is of simple and inexpensive construction.

A further object of the invention is to provide a protective device for a series capacitor using a new type of gap device which can be accurately calibrated for low voltages and connected directly across the terminals of the capacitor, and which will retain its calibration unchanged after repeated operation.

A still further object of the invention is to provide a protective device for series capacitors having a spark gap device connected directly across the terminals of the capacitor, and thermally responsive means for moving the electrodes of the gap into contact to by-pass the capacitor immediately after the gap has broken down.

The new protective device consists essentially of a combined spark gap and switching device which is connected across the series capacitor to by-pass it when the voltage across the capacitor rises above a predetermined value. The spark gap consists of a pair of closely spaced electrodes in air or other gas at a low pressure which is preferably in the range between 10 centimeters and 0.1 centimeter of mercury. Low pressure spark gap devices of this general type are disclosed and claimed in the copending application of J. Slepian and W. E. Berkey, Serial No. 358,634, filed September 27, 1940, and assigned to the Westinghouse Electric & Manufacturing Company. As more fully set forth in that application, a spark gap operating at reduced pressure in the range less than 10 centimeters of mercury shows substantially no burning or erosion of the electrodes even after repeated discharges because of the low current density at the arc terminals, and for this reason, the electrodes can be closely spaced and accurately calibrated for low voltages, and the gap will maintain its calibration after repeated operation, since there is no change in the effective spacing between the electrodes, such as is caused in gaps operating at atmospheric pressure by the burning of the electrodes by the arc. The low pressure gap has a much lower breakdown voltage than a corresponding gap operating at atmospheric pressure, but the reignition or arc extinction voltage is substantially the same as at atmospheric pressure, and for this reason, the low pressure gap has a very low ratio of breakdown voltage to extinction voltage so that it is inherently a self-extinguishing device in that the arc will not restrike after passing through a current zero if the voltage across the gap has fallen to a value only a little less than the breakdown voltage.

Because of these properties, the low pressure gap is very well suited for use as a protective device for series capacitors, since it may be connected directly across the terminals of the capacitor, and the necessity for complicated auxiliary equipment is avoided. In order to prevent damage to the gap or surrounding structures by the arc if the overvoltage persists for more than a few cycles, the protective gap of the present invention is constructed to also operate as a switching device and thermally responsive means is provided for moving the electrodes together to extinguish the arc and establish a shunt circuit around the capacitor. The thermally responsive device is mounted closely adjacent the gap and is actuated by the heat of the arc and by heat due to the current passing through a resistive element of the device to cause one of the electrodes to be moved into contact with the other one.

The invention will be more fully understood from the following detailed description, taken in connection with the accompanying drawing, in which.

Figure 1:
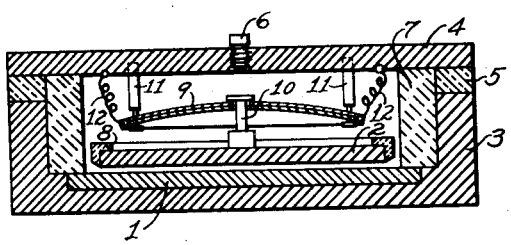
Figure 1 is a vertical sectional view of one embodiment of the invention.

The protective device shown in Fig. 1 is an enclosed low pressure spark gap device consisting of two flat disk-shaped electrodes 1 and 2 of relatively large area. The electrodes are preferably made of copper because of its high thermal conductivity, but any other suitable material, such as brass, may be used. The electrodes 1 and 2 are contained in an air-tight chamber, which may be formed by a lower cup-shaped member 3 and an upper plate 4 sealed together as indicated at 5. The members 3 and 4 are preferably made of the iron-nickel-cobalt alloy known as Kovar, and are sealed together at 5 by a glass seal, since this alloy has the property of forming an air-tight seal with glass. Any other conducting material may, of course, be used for the members 3 and 4, and the two members sealed together by any suitable insulating sealing material which will form an air-tight seal. A pumping connection 6 is provided in the upper plate 4 through which the chamber may be evacuated to a pressure less than 10 centimeters of mercury, after which the connection 6 is sealed off. The lower electrode 1 is fixed in position, and is preferably secured in a recess in the cup member 3, as shown in Fig. 1, so as to make good electrical contact with it. A refractory insulating ring 7 is placed inside the chamber to prevent the arc from striking to the conducting cup member, and a refractory insulating ring 8 is placed about the periphery of the upper electrode 2 to prevent the arc from spreading beyond the electrodes.

As stated above, the lower electrode 1 is stationary. The upper electrode 2, however, is movably mounted and is adapted to be moved into contact with the lower electrode 1 by a thermally responsive device which is illustrated as a bi-metallic disk 9 of relatively large size. The electrode 2 is preferably mounted directly on the disk 9 by means of a short stud 10, and the disk 9 is supported from the upper plate 4 by means of posts 11 disposed at spaced points about its periphery. Flexible shunts 12 may be provided to connect the bimetallic disk 9 to the upper plate 4 so that a good electrical connection is insured. The leads to the external circuit are connected to the members 3 and 4, which are insulated from each other by the seal 5.

Figure 2:
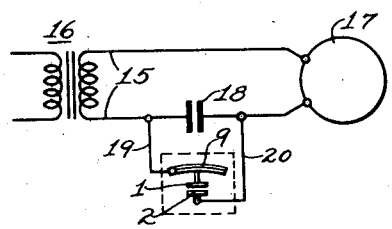
Fig. 2 is a wiring diagram showing the connection of the protective device to a series capacitor.

The protective device is connected directly across the terminals of a series capacitor as illustrated in Fig. 2. This figure shows a single phase alternating current line 15 supplied by a transformer 16 and connected to a load indicated diagrammatically at 17. A capacitor 18 is connected in series with the line 15 to neutralize part or all of the inductive reactance of the line, and the protective device shown in Fig. 1 is connected directly across the terminals of the capacitor 18 by the leads 19 and 20.

The operation of the protective device should now be apparent. The electrodes 1 and 2 in their normal position are separated by a small spacing of the order of 1 or 2 mm., and the spacing between the electrodes and the pressure in the air-tight chamber are adjusted to give the desired breakdown voltage, which is preferably equal to 200% of the rated voltage of the capacitor 18. If the voltage across the capacitor rises above this value as the result of a short-circuit or heavy overload on the line, the gap immediately breaks down, thus by-passing the capacitor and protecting it from the overvoltage. If the overvoltage lasts for only a few half cycles, the arc will be interrupted, and the capacitor restored to service as soon as the voltage falls to its normal value, because of the self-extinguishing characteristics of the low pressure gap as explained above. If the overvoltage is maintained for a longer time than a few half cycles, however, the large amount of heat generated by the arc will heat the bi-metallic disk 9 to a temperature at which it will flip over and bring the upper electrode 2 into contact with the lower electrode 1. The heat generated by the heavy current flowing through the disk 9 also assists in rapidly raising the temperature of the disk. When the electrodes come into contact, the arc is extinguished and a shunt circuit is completed around the capacitor 18 to protect it from the overvoltage. The bimetallic disk 9 and the electrodes 1 and 2 begin to cool as soon as the arc is extinguished, and after a more or less definite time interval, the bimetallic disk 9 flips back to its initial position, separating the electrodes and opening the shunt circuit. In most cases, this time interval will be long enough to permit a short-circuit on the line to be cleared by the usual protective devices, but if the overvoltage still exists when the electrodes are separated, the gap will immediately break down, and the same operation is repeated so that the capacitor is fully protected at all times. Normally, when the electrodes are separated, they will only be required to interrupt the normal full load current, which is a relatively easy duty, especially with the capacitor in shunt to the electrodes.

Figure 3:
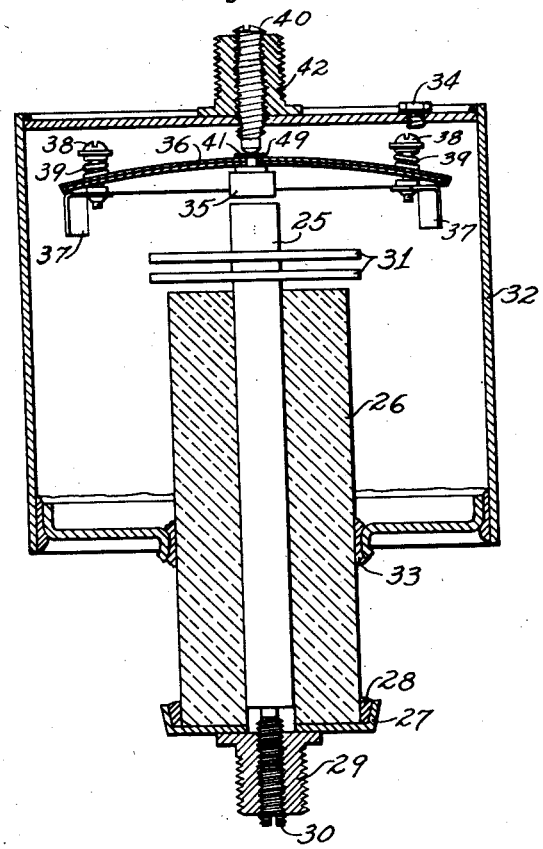
Fig. 3 is a vertical sectional view showing another embodiment of the invention.
Figure 4:
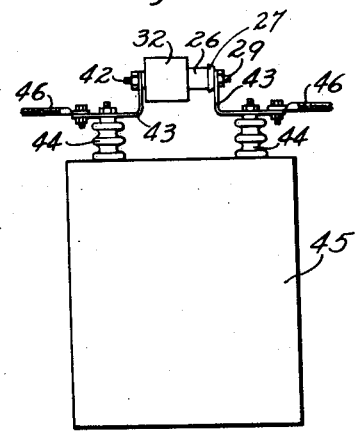
Fig. 4 is an elevation of a capacitor unit with the protective device of Fig. 3 mounted in place on it.

Another embodiment of the invention is shown in Figs. 3 and 4 which is suitable for mounting directly on the terminals of a capacitor unit. In this embodiment of the invention the lower or stationary electrode 25 is supported in a porcelain tube 26. The electrode 25 is a relatively long rod of copper, brass, or other suitable material, and has a sliding fit in the porcelain tube 26. The lower end of the tube 26 is covered by a cap 27 of brass or other suitable material, which is sealed to the porcelain, as indicated at 28, by soldering to a platinized surface of the porcelain, or by other suitable means, and the electrode 25 is adjustable in the cap 27 by means of the terminal stud 29 which is threaded on an extension 30 at the end of the electrode, the arrangement being such as to prevent the entrance of air into the tube 26. If desired, fins 31 may be provided near the upper end of the electrode 25 to assist in radiating heat from it during a discharge across the gap.

The gap device is enclosed in an air-tight chamber which is formed by a cylindrical brass housing 32 sealed to the porcelain tube as indicated at 33, by soldering or other suitable means to form an air-tight seal. The brass housing 32 is completely closed and made air-tight by soldering or brazing all its joints. A pump connection 34 is provided in one end of the housing to permit the interior to be evacuated to the desired low pressure, after which the opening 34 is sealed off.

The upper electrode 35 is preferably made of a refractory metal, such as tungsten, to withstand the high temperature caused by a discharge of long duration, and, if desired, the upper face of the electrode 25 may also be made of tungsten. The upper electrode 35 is mounted on a large bimetallic disk 36 which is supported at three points about its periphery on brackets 37 secured to the inner wall of the housing 32. The disk 36 is resiliently secured to the brackets 37 by means of bolts 38 and springs 39 to permit it to freely deflect and to provide good electrical connection with the housing 32. A threaded stud 40 extends through the top of the housing 32 and engages a contact plate 41 on the bimetallic disk to limit its upward movement and thus determine the spacing between the electrodes in their normal separated position. The stud 40 is threaded in the terminal stud 42 to permit adjustment of the spacing between the electrodes.

This embodiment of the invention is adapted for mounting directly on the terminals of the capacitor unit as shown in Fig. 4. In this figure, the protective device is mounted on conducting angle brackets 43 which are clamped to the terminals 44 of a capacitor unit 45 and to the terminal studs 29 and 42 of the protective device. The brackets 43 serve both as supports for the protective device and as conductors to connect it across the capacitor unit 45. The line conductors 46 may also be connected to the opposite ends of the brackets 43.

It will be apparent that the operation of this embodiment of the invention is the same as that of the embodiment shown in Fig. 1. Thus, the electrodes 25 and 35 are normally spaced apart a small distance such as 1 or 2 mm. and the enclosed space within the housing 32 is maintained at a pressure of less than 10 cm. of mercury, the exact spacing of the electrodes and the pressure being adjusted to give the desired breakdown voltage. When the voltage across the capacitor rises above the voltage for which the gap is set, the gap breaks down and by-passes the capacitor. The heat of the arc, together with the heat generated by the current flowing through the disk 36, raises the temperature of the bimetallic disk 36, and if the overvoltage is maintained for more than a few cycles, the disk flips over and closes the electrodes 25 and 35 together, thus extinguishing the arc and by-passing the capacitor. As soon as the disk has cooled, it flips back, separating the electrodes and interrupting the shunt circuit to restore the capacitor to service. If the overvoltage does not continue long enough for the bimetallic disk to be heated to the temperature at which it operates, the arc between the electrodes will be interrupted as soon as the voltage falls below the extinction voltage of the gap, which is not much less than the breakdown voltage.

It should now be apparent that a very simple and reliable protective device has been provided for series capacitors. This new device makes use of the absence of burning of the electrodes and the low ratio of breakdown voltage to arc extinction voltage which are characteristic of the low pressure type of spark gap, as explained above, and as more fully set forth in the above mentioned copending application. Because of these characteristics, the gap can be accurately calibrated for low breakdown voltage and will maintain its calibration unchanged after repeated operation. Thus, the protective gap can be connected directly across the terminals of the capacitor, and the complicated auxiliary equipment previously required is eliminated. In order to prevent possible damage to the gap or to surrounding structures by a continued discharge, the invention provides thermally responsive means for moving the electrodes together if the overvoltage persists for more than a few half cycles. In this way, the capacitor is by-passed and protected from the overvoltage in a very reliable manner, and the protective device itself is very simple and inexpensive.

It is to be understood that various modifications of the invention may be made. Thus, any suitable material may be used for the electrodes and any type of thermally responsive device may be used. The movable electrode may be arranged to be actuated either directly or indirectly by the bimetallic disk or other thermally responsive device. The enclosed spark gap preferably operates in air, but, if desired, any other inert gas such as nitrogen or argon may be used in approximately the same range of pressure as that stated for air.

It will be apparent, therefore, that although certain specific embodiments of the invention have been illustrated and described, it is not limited to the exact arrangements shown, but in its broadest aspects it includes all equivalent modifications and embodiments which come within the scope of the appended claims.

We claim as our invention:

1. A protective device for electrical apparatus for bypassing said apparatus upon the occurrence of a predetermined overvoltage, said protective device comprising a gas-tight metal container containing a gas at sub-atmospheric pressure, a fixed electrode having a plane sparking surface within the container, said fixed electrode extending to the outside of the container and being insulated therefrom, a thermally-responsive device mounted in the container, a movable electrode disposed within the container and electrically connected thereto, said movable electrode being adapted to be moved by said thermally responsive device and having a plane sparking surface which is normally spaced from the sparking surface of said fixed electrode to form a spark gap therewith, said thermally-responsive device being adapted to be heated by a discharge between the electrodes to effect movement of the movable electrode into contact with the fixed electrode, said thermally-responsive device being mounted in heat-exchange relation to the metal container, whereby the thermally-responsive device is cooled sufficiently after a discharge is extinguished by contact of the electrodes to effect separation of the electrodes at a more or less definite time interval after they have been brought together, said time interval being substantially independent of the magnitude of the current flowing through the protective device.

2. A protective device for electrical apparatus for bypassing said apparatus upon the occurrence of a predetermined overvoltage, said protective device comprising a gas-tight metal container containing a gas at sub-atmospheric pressure, a fixed electrode having a plane sparking surface within the container, said fixed electrode extending to the outside of the container and being insulated therefrom, a bimetallic disc disposed within the container, said bimetallic disc being of relatively large size so as to be capable of carrying heavy currents and being electrically connected to the container, and a movable electrode mounted on the bimetalic disc, said movable electrode having a plane sparking surface which is normally spaced from the sparking surface of the fixed electrode to form a spark gap therewith, said bimetallic disc being adapted to be heated by a discharge between the electrodes to move the movable electrode into contact with the fixed electrode, said bimetallic disc being mounted in heat-exchange relation to the metal container, whereby the bimetallic disc is cooled sufficiently after a discharge is extinguished by contact of the electrodes to effect separation of the electrodes at a more or less definite time interval after they have been brought together, said time interval being substantially independent of the magnitude of the current flowing through the protective device.

RALPH E. MARBURY.
WILLIAM E. BERKEY.